United States Patent [19]

Lorenz

[11] Patent Number: 4,744,851

[45] Date of Patent: May 17, 1988

[54] METHOD OF PRODUCING RUBBER SHEETS HAVING CLEAN AREAS

[75] Inventor: Harold K. Lorenz, Marion, Mass.

[73] Assignee: The Goodyear Tire & Rubber Company, Akron, Ohio

[21] Appl. No.: 24,120

[22] Filed: Mar. 10, 1987

Related U.S. Application Data

[63] Continuation of Ser. No. 694,374, Jan. 24, 1985, abandoned.

[51] Int. Cl.$^4$ .................. B32B 31/04; B32B 31/14
[52] U.S. Cl. .................. 156/289; 156/247; 264/340
[58] Field of Search .................. 156/247–248, 156/272.2, 344, 289, 96, 395, 137, 157, 159, 276, 304.1, 304.5, 308.2, 344, 90, 323; 264/236, 347, 319, 248, 338, 326, 340; 428/519–520; 474/259

[56] References Cited

U.S. PATENT DOCUMENTS

| | | | |
|---|---|---|---|
| 2,656,292 | 10/1953 | Hoover | 156/289 |
| 3,031,364 | 4/1962 | Perkins | 156/141 |
| 3,945,871 | 3/1976 | Schelkmann | 264/326 |
| 4,343,667 | 8/1982 | Hollis | 156/157 |

OTHER PUBLICATIONS

Westley et al., "Seam Adhesion of EPDM Roofing Membranes", pp. 13–16, Lord Corporation, 1–1984.

*Primary Examiner*—Merrell C. Cashion, Jr.
*Attorney, Agent, or Firm*—M. R. Dion, Sr.

[57] ABSTRACT

There is provided a method of producing rubber sheeting having a top surface and a bottom surface wherein an area of at least one of said surfaces is protected against surface contamination, comprised of:

(a) applying to said area of uncured rubber sheeting a releasable strip of material prior to the uncured rubber sheeting being exposed to surface contamination, and (b) curing said uncured rubber sheeting with the releasable strip attached. There is also provided a rubber sheet having a top surface and a bottom surface wherein an area of at least one of said surfaces has been protected against surface contamination by the method above.

3 Claims, No Drawings

METHOD OF PRODUCING RUBBER SHEETS HAVING CLEAN AREAS

This is a Continuation of application Ser. No. 694,374 filed on Jan. 24, 1985 now abandoned.

FIELD OF INVENTION

This invention relates to a process for producing rubber sheeting having clean edges to facilitate splicing. It also relates to rubber sheeting, e.g. rubber roofing, produced by the method above.

BACKGROUND ART

Rubber sheeting materials are used in a variety of applications, e.g. tank lining, pond liners, roofing membranes, etc. When the area to be covered is greater than the width or length of the rubber sheets, it becomes necessary to lap splice two or more sheets together. As a practical matter, it is desirable that these splices be made as quickly as possible without undue preparation of the mating surfaces. Furthermore, it is desirable to avoid the presence of foreign substances or contamination which may effect the integrity of the splice.

Typical manufacturing processes for rubber sheets, such as is disclosed in U.S. Pat. No 4,343,667, use dusting compounds applied to each side of the uncured sheets prior to storing in roll form on a curing mandrel in order to prevent the sheeting material from sticking to itself. The particles of dusting powder become embedded into the surface of the rubber sheet during the rolling-up and curing cycles, necessitating their removal prior to splicing. One commonly used method for cleaning the splice area has been to wash the area with solvents using brushes or rags. This method is time-consuming and requires great care to avoid any detrimental effects on the environment due to the use of volatile solvents.

The need for rubber sheeting having clean splice edges, particularly as applied to EPDM roofing membranes, has been described by S. A. Westley and E. L. Polaski in a paper presented at the Akron Rubber Group Winter Symposium, Jan. 26, 1984, and published in *Elastomerics* magazine, May 1984. p. 13.

DISCLOSURE OF THE INVENTION

In accordance with the practice of the present invention, there is provided a method of producing rubber sheeting having a top surface and a bottom surface wherein an area of at least one of said surfaces is protected against surface contamination, comprised of:
  (a) applying to said area of uncured rubber sheeting a releasable strip of material prior to the uncured rubber sheeting being exposed to surface contamination, and
  (b) curing said uncured rubber sheeting with the releasable strip attached.

There is also provided a rubber sheet having a top surface and a bottom surface wherein an area of at least one of said surfaces has been protected against surface contamination by the method above.

The types of rubber sheeting for which the process of the present invention is particularly suitable are any one of a number of polymeric compositions which have been compounded to be cured after fabrication by exposure to heat and/or steam wherein one surface portion of the rubber sheeting may be in contact with another surface portion. The rubber sheeting can be produced as a single sheet of indefinite length having a definite width as constrained by the size of the machine on which it is produced or it can be a plurality of sheets which have been spliced, during manufacturing, along adjacent edges of their lengths to provide a sheet having a variable width as is described in U.S. Pat. No. 4,343,667, which is hereby incorporated by reference.

Representative of, but not limited to, the polymers which form the bases of these compositions are ethylene-propylene-diene terpolymers, polychloroprene, natural rubber, polyisoprene, polybutadiene, butyl rubber, halobutyl rubber, copolymers of styrene and butadiene, copolymers of acrylonitrile and butadiene, and any combinations thereof. It is to be understood that the polymer compositions also contain other compounding ingredients such as fillers, curatives, antidegradants and processing aids.

Surface contamination includes but is not limited to, that resulting from the intentional application of a substance to the rubber sheeting during processing in order to prevent the layers of sheeting from sticking or curing to themselves, as well as inadvertent contamination by exposure to materials which will interfere with adhesion during splicing. Representative of, but not limited to, the intentionally applied contaminants are talc, mica, soap, soapstone and clay, which are applied as dusting compounds to the rubber sheeting. Representative of the inadvertent contaminants, exposure to which is protected by the process of the present invention, are dust, dirt and moisture.

The releasable strip of material which is applied to the edge of the rubber sheet can be any material meeting the following criteria. It must possess temperature and moisture resistance so as not to be degraded, e.g. melting, shrinking etc., upon exposure to heat and moisture during the curing cycle. It must have sufficient strength to enable it to be peeled from the cured rubber sheet without tearing. And it must not deposit a residue which would impair the effectiveness of splice adhesives. It has been discovered that a solution cast polyvinyl chloride film containing a polymeric plasticizer, a high temperature stabilizer and an internal delustering agent is particularly suitable as a releasable strip. Preferably it is cast in a thickness from 13 micrometers to about 38 micrometers, more preferably in a thickness from 19 micrometers to about 32 micrometers. The types of polymeric plasticizers which can be used in the polyvinyl chloride film are e.g. polyester glutarates, polyester sebacates, polyester adipates, epoxidized soybean oil, di-undecylphthalates, n-octyl-n-decyl trimellitate and blends thereof. The types of high temperature stabilizers which can be used in the polyvinyl chloride film are e.g. various combinations of metals and their salts such as tin, tin and lead, calcium and zinc, zinc and strontium, antimony, phosphites, barium, cadmium and zinc compounds etc. The types of internal delustering agents which can be used in the polyvinyl chloride film are e.g. diatomaceous earths, mica, silica, calcium carbonate and glass beads. The polymeric plasticizer and the high temperature stabilizer function to prevent the film from degrading upon exposure to heat and moisture. The internal delustering agent enhances the releasability of the film. Such a releasable material meeting the criteria above is commercially available from The Goodyear Tire & Rubber Company under the trade designation Cast Vinyl Film, Type LLC. It is expected that other compounds with other base polymers and other methods of manufacturing, e.g. extrusion or calendering, could be used in the practice of this invention.

The strip of releasable material can be applied to the surface of the rubber sheet either directly or the releasable strip has been lightly dusted with a dusting compound in order to facilitate its releasability. It can be applied to one or more edges of one surface, to alternating edges of alternating surfaces or any combination thereof including intermediate positions on the surfaces wherever it would be desirable to maintain a clean surface following application of the dusting compound to the rubber sheet and the curing process. For the curing process, the dusted rubber sheet with the releasable strip applied is rolled upon on a mandrel, placed in an autoclave and submitted to heat and steam pressure for the curing period. Following curing, the removal of the releasable strip is normally accomplished while the rubber sheet is still warm in order to facilitate its removal.

The practice of this invention provides rubber sheeting, particularly roofing membranes, which requires little or no preparation of the splice area such as by solvent washing prior to the application of primers and/or adhesives.

While certain representative embodiments and details have been shown for the purpose of illustrating the invention, it will be apparent to those skilled in this art that various changes and modifications may be made therein without departing from the scope of the invention.

What is claimed is:

1. A method of producing rubber sheeting having a top surface and a bottom surface wherein an area of at least one of said surfaces is protected against surface contamination comprising the steps of:
   (a) providing an uncured rubber sheeting,
   (b) applying to an area of said uncured rubber sheeting a releasable strip of material prior to the uncured rubber sheeting being exposed to surface contamination and
   (c) curing said uncured rubber sheeting with the releasable strip attached, wherein the releasable strip of material is an internally delustered polymerically plasticized solution cast polyvinyl chloride film.

2. The method according to claim 1 wherein the film has a thickness from 13 micrometers to about 38 micrometers.

3. The method according to claim 2 wherein the film has a thickness of from 19 micrometers to about 32 micrometers.

* * * * *